United States Patent
Cheng et al.

(10) Patent No.: US 9,450,844 B2
(45) Date of Patent: Sep. 20, 2016

(54) PHYSICAL LAYER MEASUREMENTS FOR MULTICAST OR BROADCAST SERVICES

(71) Applicants: Alcatel-Lucent USA Inc., Murray Hill, NJ (US); Alcatel Lucent, Boulogne-Billancourt (FR)

(72) Inventors: Fang-Chen Cheng, Murray Hill, NJ (US); Sudeep Palat, Swindon (GB)

(73) Assignee: Alcatel Lucent, Boulogne-Billancourt (FR)

(*) Notice: Subject to any disclaimer, the term of this patent is extended or adjusted under 35 U.S.C. 154(b) by 126 days.

(21) Appl. No.: 14/315,814

(22) Filed: Jun. 26, 2014

(65) Prior Publication Data

US 2015/0381448 A1 Dec. 31, 2015

(51) Int. Cl.
*H04L 12/26* (2006.01)
*H04L 12/18* (2006.01)
*H04W 4/06* (2009.01)

(52) U.S. Cl.
CPC ......... *H04L 43/0823* (2013.01); *H04L 12/189* (2013.01); *H04L 12/1863* (2013.01); *H04W 4/06* (2013.01)

(58) Field of Classification Search
CPC ..... H04W 4/06; H04W 24/00; H04W 28/18; H04W 56/00; H04W 52/24; H04W 28/00; H04W 76/002; H04W 52/241; H04W 52/327; H04B 17/00; H04B 17/336; H04L 1/00; H04L 1/004; H04L 1/0041; H04L 1/0045; H04L 1/02; H04L 1/20; H04L 2201/0093; H04L 65/4076; H04L 12/1868; H04L 43/0823; H04L 12/189; H03M 13/03
See application file for complete search history.

(56) References Cited

U.S. PATENT DOCUMENTS

| | | | |
|---|---|---|---|
| 2006/0072538 A1* | 4/2006 | Raith | H04L 1/0041 370/349 |
| 2008/0117904 A1* | 5/2008 | Radha | H04L 1/0009 370/389 |
| 2008/0220819 A1* | 9/2008 | Ben-Eli | H04B 7/0874 455/561 |
| 2008/0240011 A1* | 10/2008 | Kim | H04L 1/0061 370/312 |
| 2009/0305712 A1* | 12/2009 | Franceschini | H04W 52/08 455/450 |
| 2010/0110879 A1* | 5/2010 | Kim | H04L 1/1685 370/216 |
| 2010/0203886 A1* | 8/2010 | Nobukiyo | H04W 72/005 455/434 |
| 2011/0161771 A1* | 6/2011 | Zheng | H03M 13/033 714/752 |
| 2012/0163286 A1* | 6/2012 | Huschke | H04L 12/1881 370/315 |
| 2013/0010624 A1* | 1/2013 | He | H04L 41/5009 370/252 |
| 2013/0163444 A1* | 6/2013 | Tee | H04L 69/40 370/252 |

(Continued)

OTHER PUBLICATIONS

"3rd Generation Partnership Project; Technical Specification Group Services and System Aspects; Multimedia Broadcast/Multicast Service (MBMS); Architecture and Functional Description (Release 12)" 3 GPP TS 23.246 V12.1.0, Mar. 2014, 67 pages.

(Continued)

*Primary Examiner* — Ahmed Elallam
(74) *Attorney, Agent, or Firm* — Davidson Sheehan LLP

(57) ABSTRACT

User equipment measure a characteristic of a multicast signal or a broadcast signal at a physical layer of user equipment for a multicast broadcast single frequency network (MBSFN) area associated with the user equipment. The user equipment provide a value of the measured characteristic from the user equipment in response to the value indicating that a probability of an application layer decoding error exceeds a first threshold. The measured characteristic may be a block error rate (BLER) or a signal-to-interference ratio (SIR) for the multicast signal or the broadcast signal.

19 Claims, 6 Drawing Sheets

(56) References Cited

U.S. PATENT DOCUMENTS

| | | | |
|---|---|---|---|
| 2014/0112172 A1* | 4/2014 | Vangala | H04W 24/08 370/252 |
| 2014/0192698 A1* | 7/2014 | Anchan | H04W 4/06 370/312 |
| 2014/0200001 A1* | 7/2014 | Song | H04W 36/0094 455/436 |

OTHER PUBLICATIONS

"3rd Generation Partnership Project; Technical Specification Group Radio Access Network; Evolved Universal Terrestrial Radio Access (E-UTRA); Physical Channels and Modulation (Release 12)" 3 GPP TS 36.211 V12.1.0, Mar. 2014, 120 pages.

"MBSFN Radio Measurements" 3 GPP TSG-RAN1 Meeting #75, Sep. 11, 2013, 7 pages.

* cited by examiner

PHYSICAL LAYER MEASUREMENTS FOR MULTICAST OR BROADCAST SERVICES

BACKGROUND

1. Field of the Disclosure

The present disclosure relates generally to wireless communication systems and, more particularly, to multicast and broadcast services in wireless communication systems.

2. Description of the Related Art

Wireless communication standards such as Long Term Evolution (LTE, LTE-Advanced) support broadcasting or multicasting services such as the multimedia broadcast multicast service (MBMS) or the enhanced multimedia broadcast multicast service (eMBMS). The MBMS services broadcast or multicast data from base stations over the air interface on channels that can be received by one or more user equipment (UE). The eMBMS is an enhanced version of MBMS that provides additional features such as an architecture and physical layer enhancements that allow the eMBMS service to carry multimedia information to the UE. The term "MBMS" may be used to refer to either MBMS or eMBMS depending on the context. Typically, the UE subscribe to particular programs so that they may subsequently receive the programs, e.g., as packets transmitted by the base stations using the MBMS service.

Missing packets or corrupted packets may be detected at the application layer of the UE and requests for retransmission of the missing or corrupted packets may be generated at the application layer using a dedicated channel. If the number of retransmissions using dedicated channels increases, the resources consumed by the dedicated channels would increase and the spectrum efficiency would be reduced. Moreover, the retransmission requests are the same for the missing or corrupted packets and so the network that is providing the MBMS service is not able to use the retransmission requests to determine whether the packets were lost or corrupted due to network congestion, radio link conditions, or other problems in the network.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

User equipment (UE) that are receiving an MBMS service can help a network diagnose the cause of decoding errors at the application layer of the UE by measuring a characteristic of the MBMS signals at the physical layer and providing a value of the measured characteristic to the network in response to the value indicating that a probability of an application layer decoding error exceeds a threshold. The characteristic may be for a multicast broadcast single frequency network (MBSFN) area associated with the user equipment. Some embodiments of the UE measure a block error rate (BLER) of a multicast channel used to transmit the MBMS signals. For example, the BLER may indicate a ratio of a number of transport blocks received over the multicast channel that resulted in a cyclic redundancy check (CRC) error and a total number of transport blocks received over the multicast channel within a time interval. A high probability of an application layer decoding error, e.g., due to setting a modulation and coding scheme (MCS) too aggressively for current channel conditions, may be indicated by the BLER being greater than a threshold BLER. Some embodiments of the UE measure a signal-to-interference ratio (SIR) for signals received over a physical multicast channel within a time interval. For example, the SIR may be a ratio of a signal power received over the physical multicast channel and an estimate of the total interference on the physical multicast channel over the time interval. A high probability of an application layer decoding error may be indicated by the SIR being less than a threshold SIR.

Figure 1:
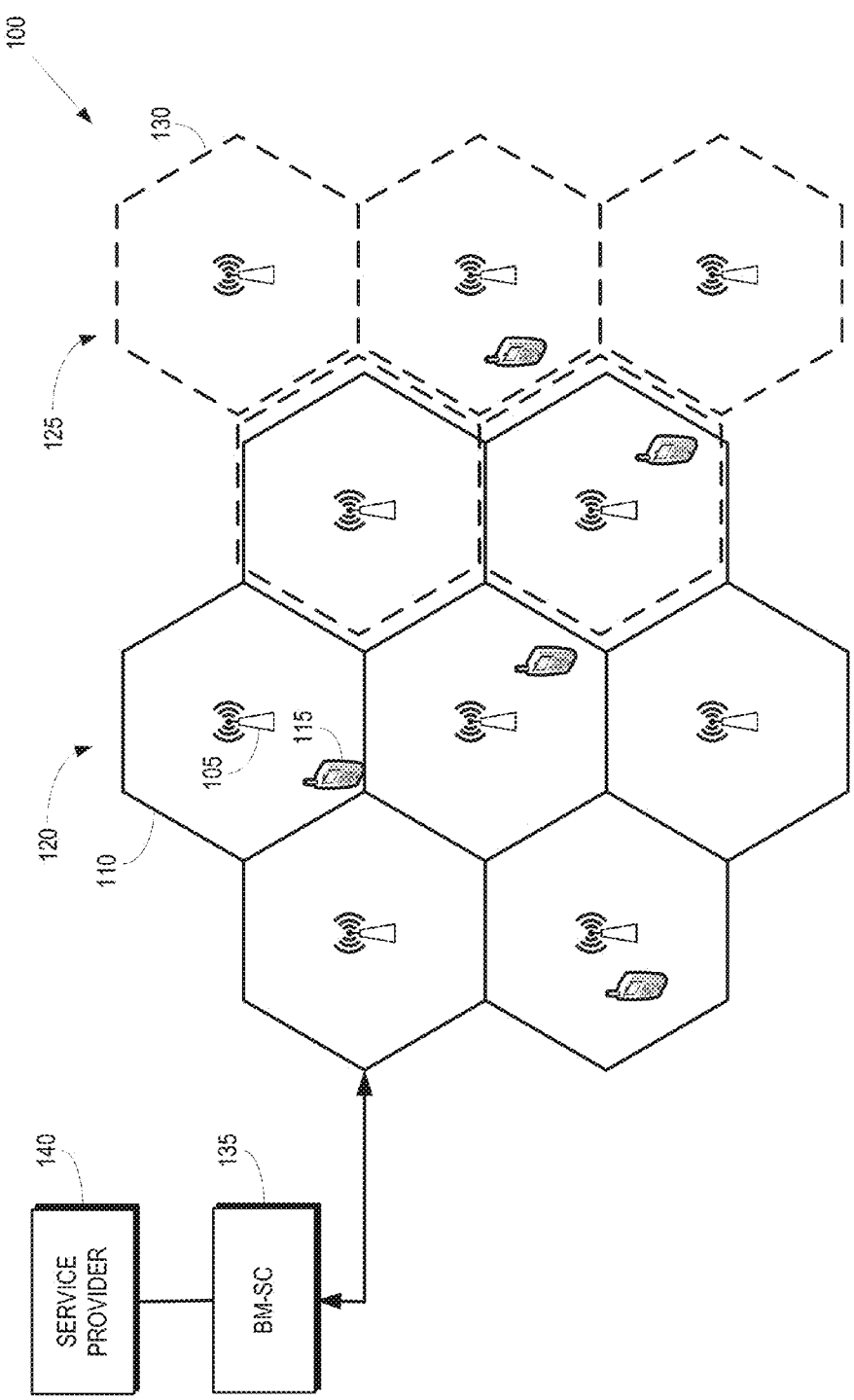
FIG. 1 is a block diagram of a first example of a wireless communication system according to some embodiments.

FIG. 1 is a block diagram of a first example of a wireless communication system 100 according to some embodiments. The wireless communication system 100 includes a plurality of base stations 105 for providing wireless connectivity to a corresponding plurality of cells 110 (only one base station and one cell are indicated by a reference numeral in the interest of clarity). The base stations may also be referred to as base transceiver stations, eNodeBs, eNBs, access points, access nodes, access networks, and the like. The base stations 105 provide wireless connectivity to user equipment 115 (only one indicated by a reference numeral in the interest of clarity) located in or near the corresponding cells 110. Wireless connectivity may be provided according to standards such as the standards defined by the Third Generation Partnership Project (3GPP). For example, the base stations 105 may provide wireless connectivity according to the Long Term Evolution (LTE) standards defined by the 3GPP.

The base stations 105 can provide multicast signals or broadcast signals to the user equipment 115. As used herein the term "multicast signals" refers to signals that are transmitted to and can be received by a subset of the user equipment 115, such as user equipment 115 that have subscribed to a multicast service. Multicasting may therefore be referred to as a one-to-many transmission scheme. As used herein, the term "broadcast signals" refers to signals that are transmitted to and can be received by substantially all of the user equipment 115 that are within range of the broadcast signals. Broadcasting may therefore be referred to as a one-to-all transmission scheme. Some embodiments of the base stations 105 may provide the multicast or broadcast signals according to agreed-upon industry standards such as the LTE standards for multimedia broadcast multicast service (MBMS) or enhanced MBMS (eMBMS).

Broadcast or multicast signals transmitted by multiple base stations 105 can be synchronized to provide the same signaling on the same frequency channel in a predetermined subset of the cells 110. For example, the base stations 105 that provide service to the cells 110 indicated by the solid line hexagons can be synchronized to provide the same broadcast or multicast content to user equipment 115 in the cells 110. The group of cells 110 may be referred to as a multicast broadcast single frequency network (MBSFN) area 120. Some embodiments of the base stations 105 in the MBSFN area 120 may transmit the same content information to user equipment 115 using a subset of available radio resources. The broadcast or multicast signals transmitted by the base stations 105 in the MBSFN area 120 may be sufficiently tightly synchronized so that the broadcast or multicast signals arrive at the user equipment 115 within the duration of a cyclic prefix to reduce or avoid inter-symbol interference. User equipment 115 may therefore non-coherently combine the multicast or broadcast signals received from multiple base stations 105 in the MBSFN area 120. This process may be referred to as radio link combining Other available radio resources may be used to support dedicated channels for unicasting the content information to one or more of the user equipment 115.

The wireless communication system 100 may include multiple, potentially overlapping, MBSFN areas such as the MBSFN area 120 including the cells 110 indicated by solid line hexagons and the MBSFN area 125 including cells 130 indicated by dashed line hexagons. Base stations 105 providing multicast or broadcast service to the cells 110 in the MBSFN area 120 are synchronized to each other and provide the multicast or broadcast signals on a first frequency channel. Base stations providing multicast or broadcast service to the cells 130 in the MBSFN area 125 are synchronized to each other and provide the multicast or broadcast signals on a second frequency channel that is different than the first frequency channel. User equipment 115 can subscribe to the multicast or broadcast services provided by either MBSFN area 120, 125 or both MBSFN areas 120, 125 and may receive both services if they are in overlapping portions of the MBSFN areas 120, 125. Some embodiments of user equipment 115 can concurrently subscribe to a predetermined number of different MBSFN areas, such as eight MBSFN areas.

A controller such as a broadcast multicast service controller (BM-SC) 135 is used to control and coordinate operation of the base stations 105 in the MBSFN area 120. The BM-SC 135 may also be used to control and coordinate operation of the base stations in the MBSFN area 125 or, alternatively, a different controller could be used for the other MBSFN area 125. Some embodiments of the BM-SC 135 provide synchronization information to the base stations 105, such as a timing reference signal. The BM-SC 135 may also provide content information to be transmitted by the base stations 105. The content information may be formatted into packets that include the broadcast or multicast information. The BM-SC 135 can receive the content information from one or more service providers 140 (only one shown in FIG. 1 in the interest of clarity). The BM-SC 135 may also receive information from the base stations 105 and provide this information to the service provider 140. For example, the BM-SC 135 may receive retransmission requests from the base stations 105 and configure dedicated unicast channels to retransmit information to the requesting base station 105.

The user equipment 115 can measure characteristics of the multicast signals or the broadcast signals at the physical layer. For example, the user equipment 115 can measure a block error rate (BLER) for a multicast channel, which is a physical layer transport channel. For another example, the user equipment 115 can measure a signal-to-interference ratio (SIR) for a physical multicast channel using reference signals transmitted by the base stations 105. The measured BLER or SIR may indicate a probability that a decoding error occurs at the application layer. The user equipment 115 may transmit a message indicating a value of the measured characteristic to the BM-SC 135 in response to the value indicating that a probability of an application layer decoding error exceeds a threshold. Providing the values of the measured characteristics in response to the values exceeding a threshold may help the BM-SC 135 or the service provider 140 diagnose the cause of decoding errors at the application layer of the user equipment 115 without excessive consumption of air interface resources.

Figure 2:
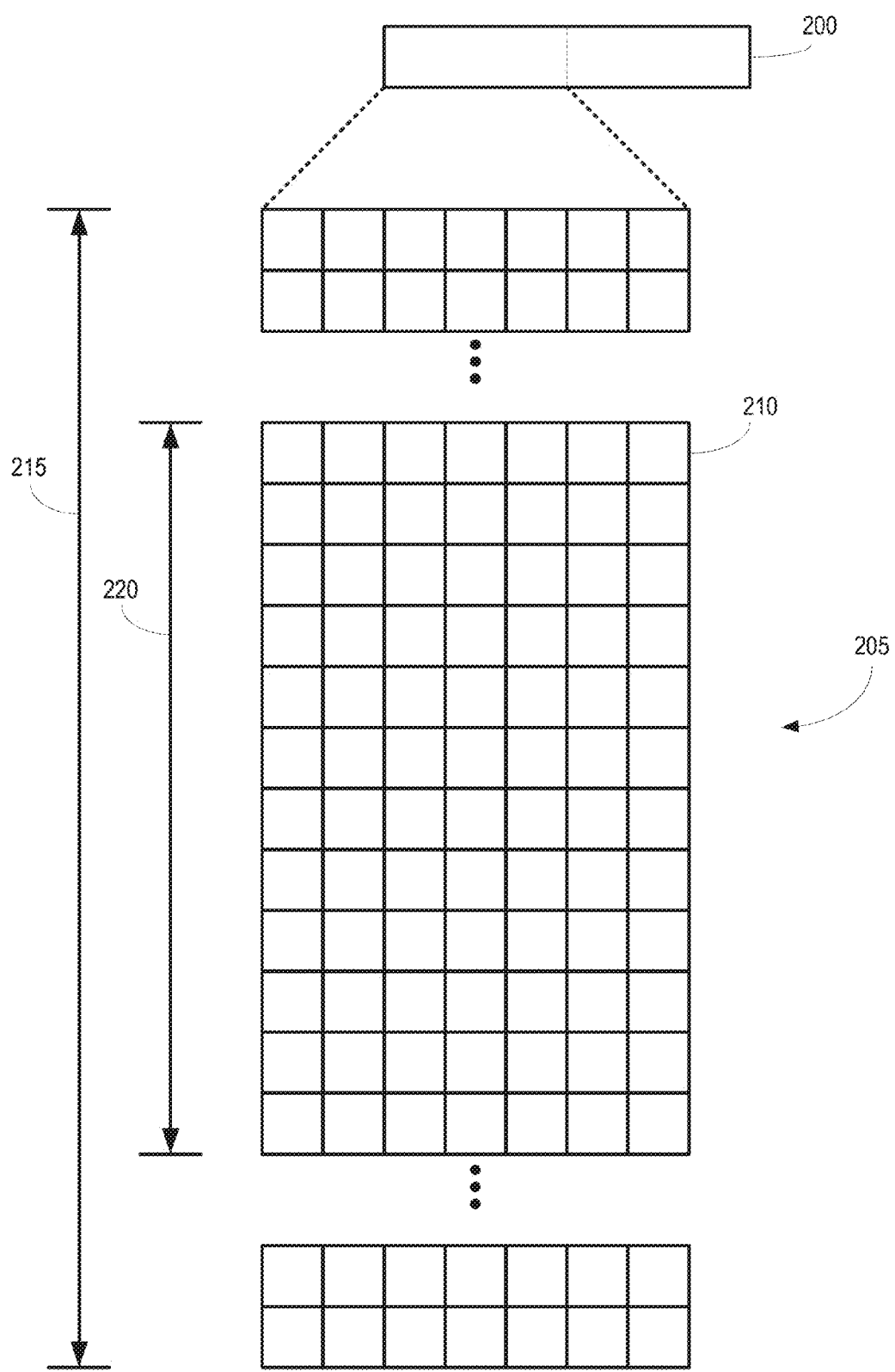
FIG. 2 is a block diagram of a resource grid for a timeslot in a frame that may be used to provide multicast or broadcast signaling according to some embodiments.

FIG. 2 is a block diagram of a resource grid for a timeslot 205 in a frame 200 that may be used to provide multicast or broadcast signaling according to some embodiments. The frame 200 may include one or more timeslots such as the timeslot 205 and may be used to transmit the multicast or broadcast signals over an air interface between base stations (such as the base stations 105 shown in FIG. 1) and user equipment (such as the user equipment 115 shown in FIG. 1). The timeslot 205 is divided into a plurality of resource elements or physical resource blocks 210 (only one indicated by a reference numeral in the interest of clarity) that are defined by a time interval and a frequency band or subcarrier frequency. For example, the timeslot 205 may have a total duration of 0.5 ms and may be divided into seven (7) time intervals that are distributed along the horizontal direction in FIG. 2. The timeslot 205 may also include a predetermined number 215 of frequency bands or subcarrier frequencies that are distributed along the vertical direction in FIG. 2. The number 215 may depend upon the transmission bandwidth of the air interface. The predetermined number 215 may also be divided into one or more subsets 220 of physical resource blocks 210.

A physical multicast channel may be used to carry the multicast or broadcast signals and the physical multicast channel may be formed from a plurality of physical resource blocks 210, which may be distributed throughout the frame 200. For example, the frame 200 may be configured as an MBSFN frame and resource blocks 210 in the frame 200 may be allocated to the physical multicast channel according to agreed-upon industry standards such as the LTE MBMS standards. The multicast or broadcast information may then be encoded according to one of a plurality of modulation and coding schemes (MCS) and transmitted in the allocated resource blocks 210. The MCS may be selected based on current channel conditions. User equipment may then perform physical layer measurements on the multicast or broadcast signals received in the allocated resource blocks 210, as discussed herein. Reference signals may also be transmitted in selected resource blocks 210.

Figure 3:
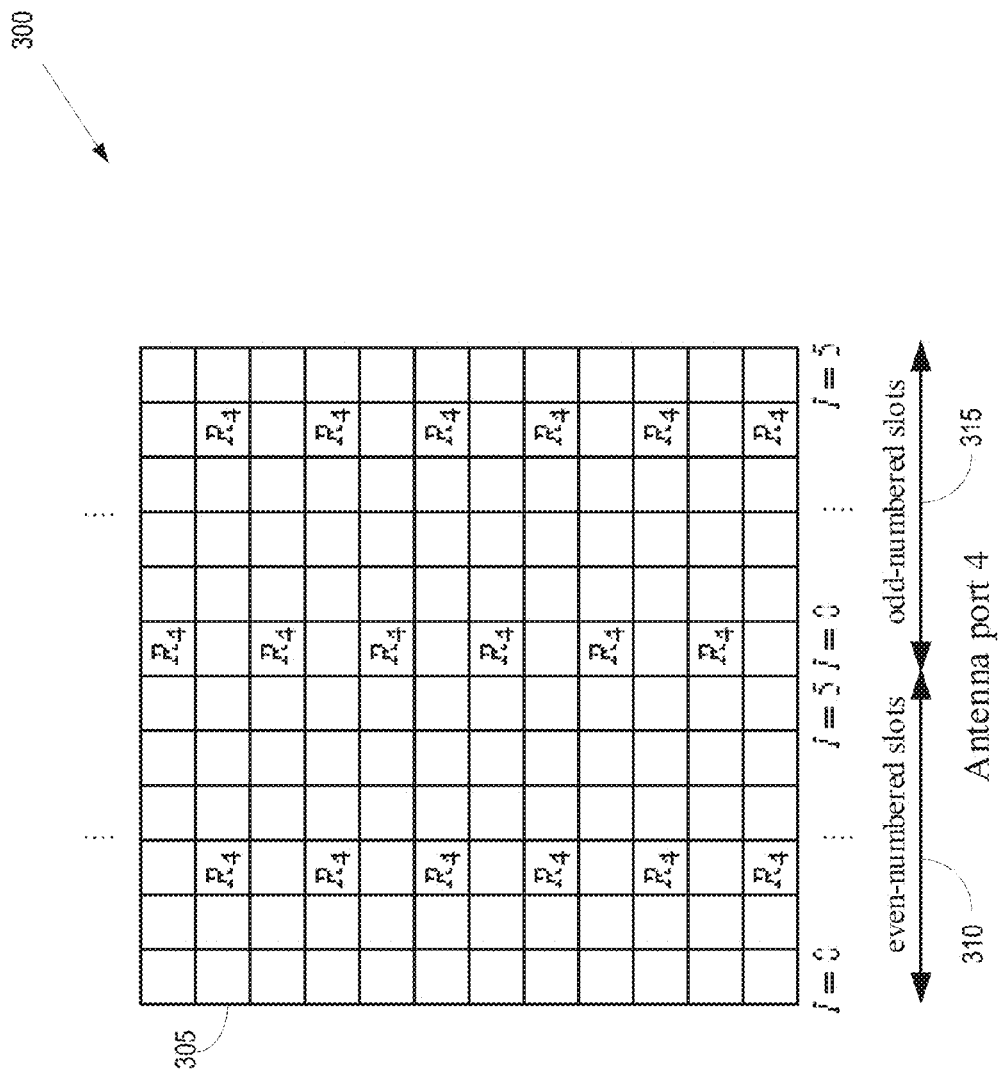
FIG. 3 is a diagram illustrating a first example of a mapping of multicast broadcast single frequency network (MBSFN) reference signals to resource elements in a pair of timeslots according to some embodiments.

FIG. 3 is a diagram illustrating a first example of a mapping 300 of MBSFN reference signals to resource elements 305 in a pair of timeslots 310, 315 according to some embodiments. Each of the timeslots 310, 315 may correspond to the timeslot 205 shown in FIG. 2. The vertical axis indicates the subcarriers (only a subset of the available subcarriers is shown in FIG. 3) and the horizontal axis indicates symbols transmitted in the timeslot 310, 315. The timeslot 310 corresponds to even-numbered timeslots and the timeslot 315 corresponds to odd-numbered timeslots. The reference signals are indicated by the symbol $R_4$ to indicate that the reference signals are transmitted on antenna port 4. The reference signals $R_4$ may only be transmitted when the physical multicast channel is transmitted. The first example of the mapping 300 assumes that the subcarriers are separated by a frequency spacing of $\Delta f=15$ kHz. User equipment can perform physical layer measurements on the reference signals to determine signal-to-interference ratios, as discussed herein.

Figure 4:
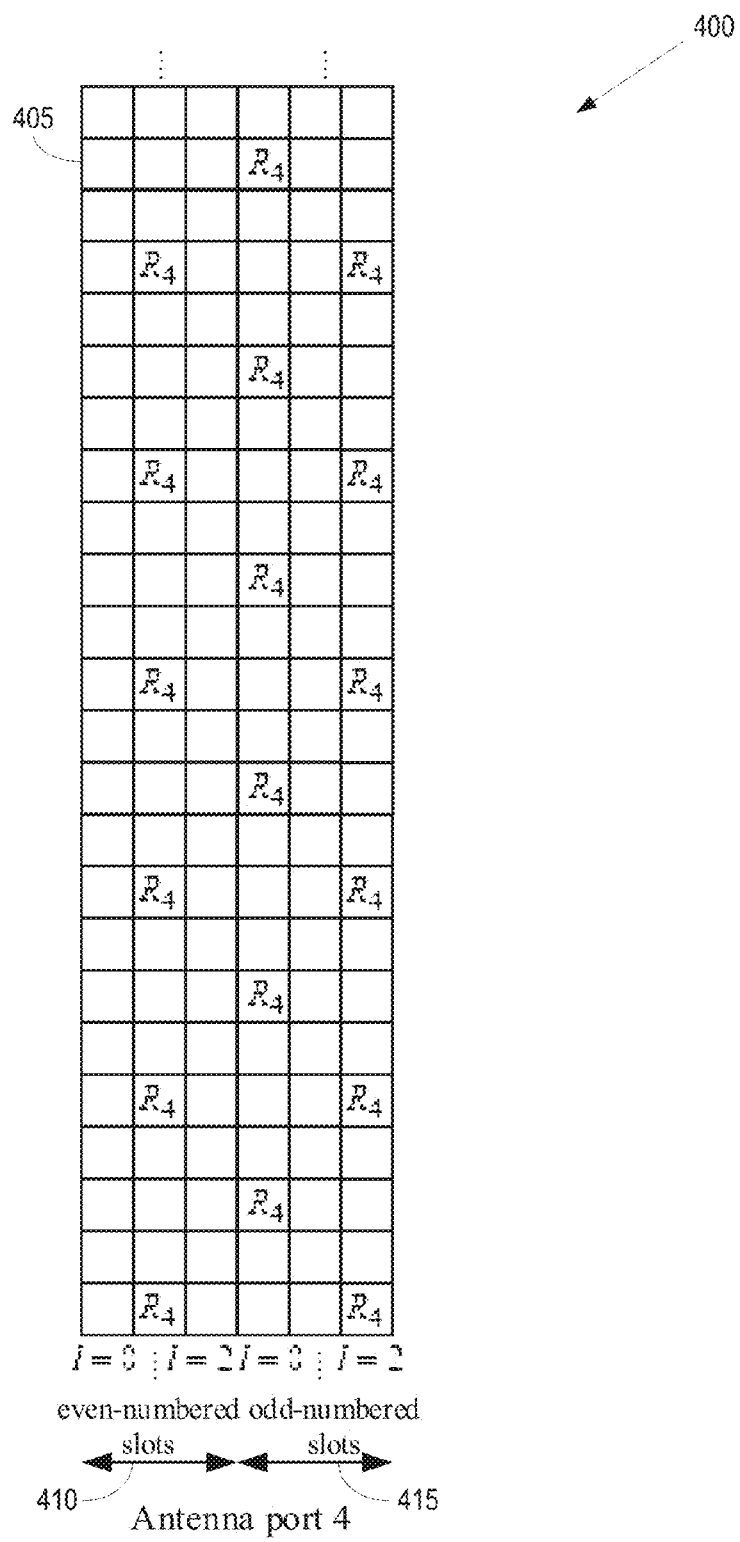
FIG. 4 is a diagram illustrating a second example of a mapping of MBSFN reference signals to resource elements in a pair of timeslots according to some embodiments.

FIG. 4 is a diagram illustrating a second example of a mapping 400 of MBSFN reference signals to resource elements 405 in a pair of timeslots 410, 415 according to some embodiments. Each of the timeslots 410, 415 may correspond to the timeslot 205 shown in FIG. 2. The vertical axis indicates the subcarriers (only a subset of the available subcarriers is shown in FIG. 4) and the horizontal axis indicates symbols transmitted in the timeslot 410, 415. The timeslot 410 corresponds to even-numbered timeslots and the timeslot 415 corresponds to odd-numbered timeslots. The reference signals are indicated by the symbol $R_4$ to indicate that the reference signals are transmitted on antenna port 4. The reference signals $R_4$ may only be transmitted when the physical multicast channel is transmitted. The first example of the mapping 300 assumes that the subcarriers are separated by a frequency spacing of $\Delta f=7.5$ kHz. User equipment can perform physical layer measurements on the reference signals to determine signal-to-interference ratios, as discussed herein.

Figure 5:
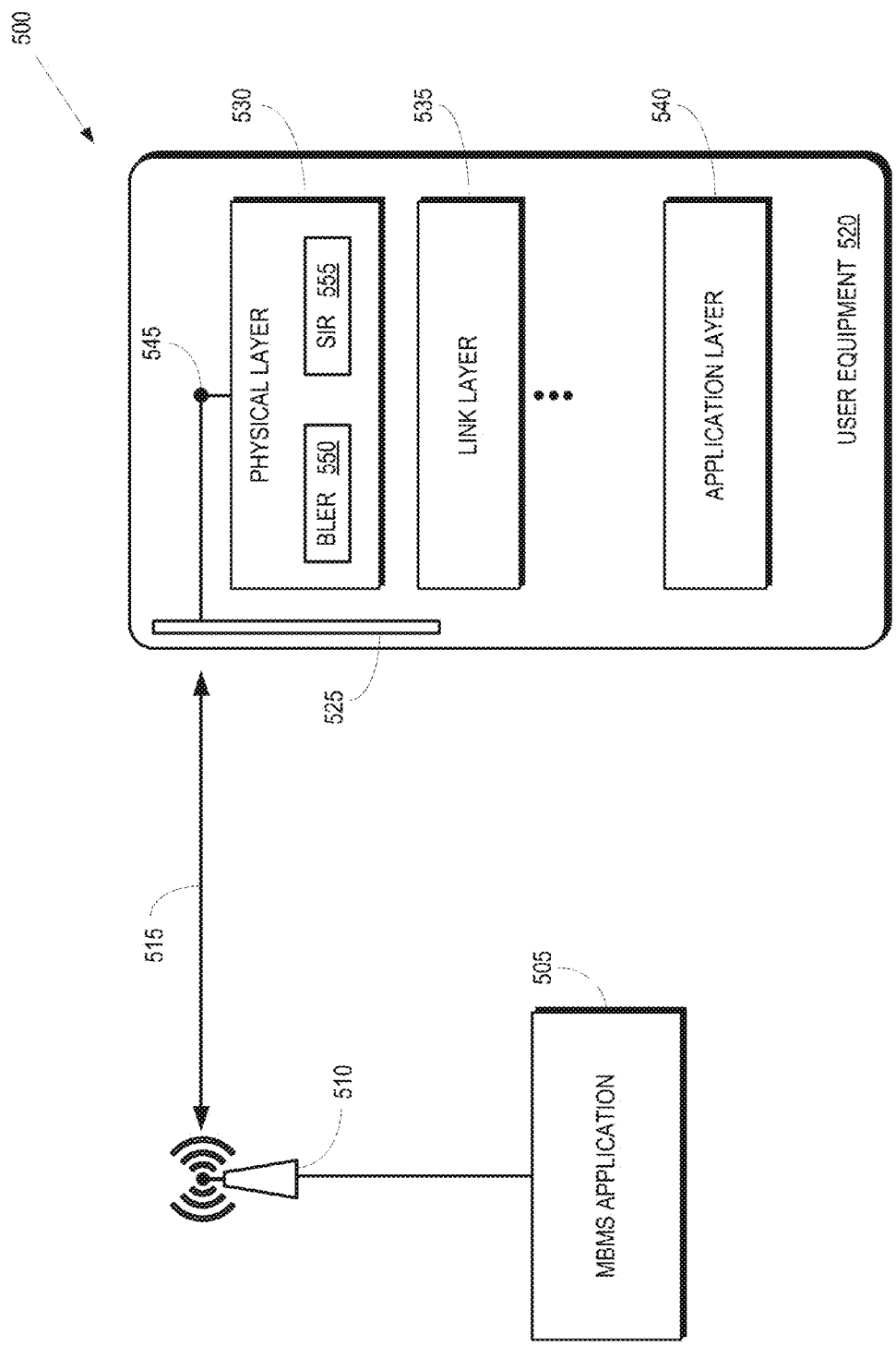
FIG. 5 is a block diagram of a second example of a wireless communication system according to some embodiments.

FIG. 5 is a block diagram of a second example of a wireless communication system 500 according to some embodiments. The wireless communication system 500 may be used as a portion of the wireless communication system 100 shown in FIG. 1. A broadcast or multicast service may be provided by an MBMS application 505, which may be implemented or operated by a service provider such as the service provider 140 shown in FIG. 1. The MBMS application 505 may generate the multicast or broadcast content information and provide the information to one or more base stations 510 for transmission over an air interface 515 to user equipment 520. The user equipment 520 includes one or more antennas 525 for receiving or transmitting signals over the air interface 515.

The user equipment 520 implements multiple layers for processing received signals and generating signals for transmission. Some embodiments of the user equipment 520 implement layers according to the Open System Interconnect (OSI) layer definitions. For example, user equipment 520 implements a physical layer 530 that is used to establish and terminate physical connections between the user equipment 520 and base stations 510. The physical layer 530 implements logic or circuitry for receiving and transmitting signals over the air interface 515. The physical layer 530 also supports the physical multicast channel for receiving broadcast or multicast signals and a multicast channel, which is a transport channel in the physical layer 530.

The user equipment 520 also implements a link layer 535. The link layer 535 is configured to encode bits into packets before transmission and then decode received packets back into bits. The multicast channel may be used to transport information between the physical layer 530 and the link layer 535. Some embodiments of the link layer 535 may be subdivided into a media access control layer and a logical link control layer. An application layer 540 is configured to interact with software applications that may be implemented by the user equipment 520. The user equipment 520 may also implement other layers between the link layer 535 and the application layer 540 such as a network layer, a transport layer, a session layer, and a presentation layer. In the interest of clarity, these layers are not depicted in FIG. 5. The lower layers, including the physical layer 530 and the link layer 535, may provide multicast or broadcast information to the application layer 540 for decoding by the multicast or broadcast application.

Characteristics of received multicast or broadcast signals can be measured in the physical layer 530. A reference point for the measured characteristics may be an antenna connection point 545 so that additional processing gain associated with processing in the physical layer 530 does not affect the values of the measured characteristics. Some embodiments of the measured characteristics may indicate a probability of a decoding error when the multicast or broadcast application at the application layer 540 attempts to decode information from the multicast or broadcast signals. Values of the measured characteristics may be configured by the base station 510 if the values indicate that the probability of an application layer decoding error exceeds a threshold. The values may be provided to the MBMS application 505 to assist the MBMS application 505 in diagnosing causes of application layer decoding errors, such as an MCS that is set too aggressively for the current channel conditions.

Some embodiments of the physical layer 530 include block error rate (BLER) logic 550 that measures the BLER for the multicast channel in the physical layer 530. The BLER logic 550 may perform a cyclic redundancy check (CRC) on each transport block of multicast or broadcast information in the physical layer 530. The multicast channel BLER (MCH-BLER) may then be defined as a ratio of the number of transport blocks that resulted in CRC errors within a time interval to the number of received multicast channel transport blocks in the same time interval. The BLER estimation may be based on evaluating the CRC of each transport block after radio link combining in the physical layer 530. The time interval may be on the order of tens of milliseconds to hundreds of milliseconds in some embodiments. For example, the MCH-BLER may be defined as a ratio of the number of transport blocks with CRC errors to the number of received multicast channel transport blocks in a time interval of 100 ms. The MCH-BLER may indicate that the probability of an application layer decoding error exceeds a threshold when the MCH-BLER is above a corresponding threshold MCH-BLER such as 1%. The measured value of the MCH-BLER may therefore be provided to the MBMS application 505 when the MCH-BLER exceeds the threshold MCH-BLER. The user equipment 520 may be associated with multiple MBSFN areas and the BLER logic 550 may perform separate measurements of the MCH-BLER for each MBSFN area.

Some embodiments of the physical layer 530 include signal-to-interference ratio (SIR) logic 555 that measures the SIR for the physical multicast channel (PMCH) in the physical layer 530. The SIR logic 555 can measure PMCH-SIR over a time interval and the average PMCH-SIR may provide an indication of average radio link quality over the time interval. The measured PMCH-SIR may also be used as an indication of received signal quality in a coverage area that includes the user equipment 520. In some embodiments, the PMCH-SIR is defined as the ratio of the PMCH received signal power to estimated total interference over the time interval. The PMCH received signal power may be defined as a linear average over power contributions (e.g., in Watts) of resource elements that carry MBSFN reference signals in configured MBSFN subframes. The PMCH-SIR may indicate that the probability of an application layer decoding error exceeds a threshold when the PMCH-SIR is below a corresponding threshold PMCH-SIR. The measured value of the PMCH-SIR may therefore be provided to the MBMS application 505 when the PMCH-SIR exceeds the threshold PMCH-SIR.

The reference point for the PMCH-SIR may be the antenna connection point 545. The user equipment 520 may be associated with multiple MBSFN areas and the SIR logic 555 may perform separate measurements of the PMCH-SIR for each MBSFN area. If the user equipment 520 implements receiver diversity, the reported value of the PMCH-SIR may not be lower than the corresponding PMCH-SIR of any of the individual diversity branches. Some embodiments of the SIR logic 555 may also measure an MBSFN received signal strength indicator that includes the linear average of the total received power of all orthogonal frequency division multiplexing (OFDM) symbols except physical downlink control channel (PDCCH) symbols in MBSFN subframes that contain MBSFN reference signals.

Figure 6:
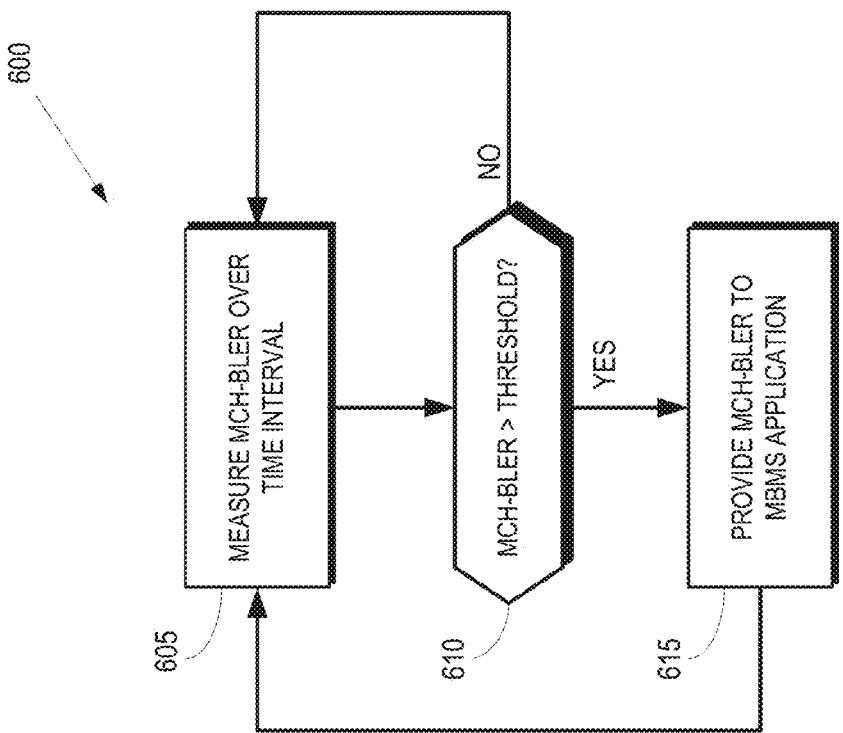
FIG. 6 is a flow diagram of a method for providing measured values of a multicast channel block error rate (MCH-BLER) according to some embodiments.

FIG. 6 is a flow diagram of a method 600 for providing measured values of a multicast channel block error rate (MCH-BLER) according to some embodiments. The method 600 may be implemented in user equipment such as the user equipment 115 shown in FIG. 1 or the user equipment 520 shown in FIG. 5. At block 605, the user equipment measures the MCH-BLER over a time interval. For example, the user equipment may accumulate the MCH-BLER over a time interval of approximately 100 ms or the user equipment may maintain a moving average of the MCH-BLER over a time window of approximately 100 ms. At decision block 610, the user equipment compares the measured value of the MCH-BLER to a threshold value, which may indicate that a probability of an application layer coding error has exceeded a corresponding threshold. If the measured value of the MCH-BLER is less than the threshold value, the user equipment does not report the value and continues to measure the MCH-BLER over the next time interval. If the measured value of the MCH-BLER is greater than the threshold value, the user equipment may provide (at 615) the measured value of the MCH-BLER to the MBMS application that is providing the multicast or broadcast service.

Figure 7:
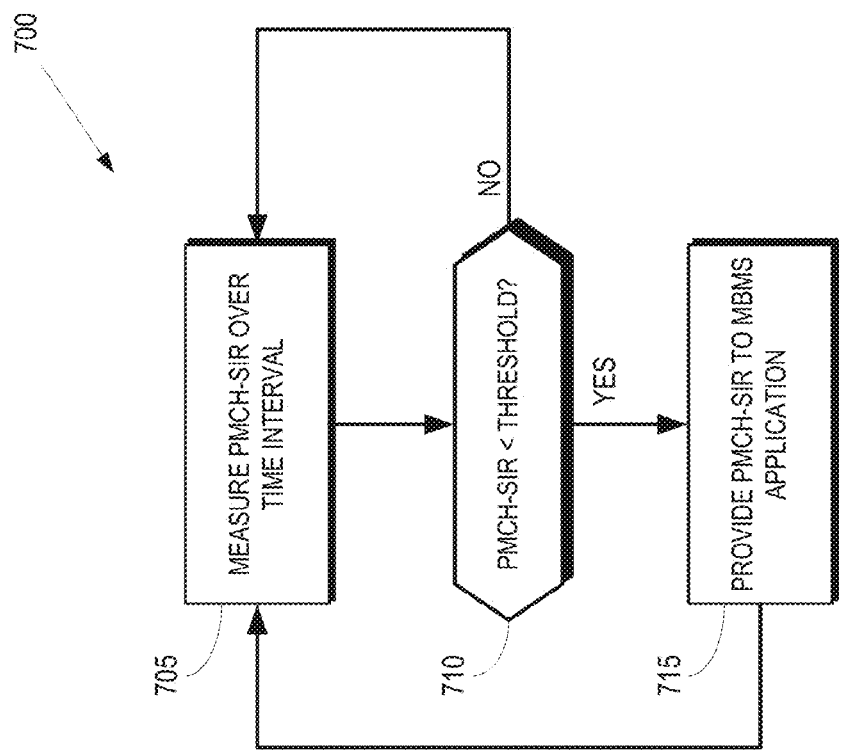
FIG. 7 is a flow diagram of a method for providing measured values of a physical multicast channel signal-to-interference ratio (PMCH-SIR) according to some embodiments.

FIG. 7 is a flow diagram of a method 700 for providing measured values of a physical multicast channel signal-to-interference ratio (PMCH-SIR) according to some embodiments. The method 700 may be implemented in user equipment such as the user equipment 115 shown in FIG. 1 or the user equipment 520 shown in FIG. 5. At block 705, the user equipment measures the PMCH-SIR over a time interval. For example, the user equipment may accumulate the PMCH-SIR over a time interval of approximately 100 ms or the user equipment may maintain a moving average of the PMCH-SIR over a time window of approximately 100 ms. At decision block 710, the user equipment compares the measured value of the PMCH-SIR to a threshold value, which may indicate that a probability of an application layer coding error has exceeded a corresponding threshold. If the measured value of the PMCH-SIR is greater than the threshold value, the user equipment does not report the value and continues to measure the PMCH-SIR over the next time interval. If the measured value of the PMCH-SIR is less than the threshold value, the user equipment may provide (at 715) the measured value of the PMCH-SIR to the MBMS application that is providing the multicast or broadcast service.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   measuring a characteristic of a multicast signal or a broadcast signal at a physical layer of user equipment for a multicast broadcast single frequency network (MBSFN) area associated with the user equipment; and
   providing a value of the measured characteristic from the user equipment in response to the value indicating that a probability of an application layer decoding error exceeds a first threshold.

2. The method of claim 1, wherein measuring the characteristic of the multicast signal or the broadcast signal comprises measuring a block error rate (BLER) for the multicast signal or the broadcast signal over a time interval.

3. The method of claim 2, wherein measuring the BLER comprises determining a ratio of a number of transport blocks that resulted in a cyclic redundancy check (CRC) error and a total number of transport blocks received over a multicast channel within the time interval.

4. The method of claim 3, wherein providing the value of the measured characteristic comprises providing a value of the BLER in response to the ratio being greater than a second ratio that indicates that the probability of the application layer decoding error exceeds the first threshold.

5. The method of claim 1, wherein measuring the characteristic of the multicast signal of the broadcast signal comprises measuring a signal-to-interference ratio (SIR) for the multicast signal or the broadcast signal over a time interval.

6. The method of claim 5, wherein measuring the SIR comprises determining a ratio of a signal power received on a physical multicast channel and an estimate of interference on the physical multicast channel over the time interval.

7. The method of claim 6, further comprising:
   determining the signal power received on the physical multicast channel using a linear average of measured powers in resource elements that carry reference signals for the multicast signal or the broadcast signal.

8. The method of claim 6, wherein providing the value of the measured characteristic comprises providing a value of the SIR in response to the ratio being less than a third ratio that indicates that the probability of the application layer decoding error exceeds the first threshold.

9. User equipment comprising:
   measurement circuitry to measure a characteristic of a multicast signal or a broadcast signal at a physical layer of the user equipment; and
   a transmitter to provide a value of the measured characteristic from the user equipment in response to the value indicating that a probability of an application layer decoding error exceeds a first threshold for a multicast broadcast single frequency network (MBSFN) area associated with the user equipment.

10. The user equipment of claim 9, wherein the measurement circuitry is to measure a block error rate (BLER) for the multicast signal or the broadcast signal over a time interval.

11. The user equipment of claim 10, wherein the measurement circuitry is to determine a ratio of a number of transport blocks that resulted in a cyclic redundancy check (CRC) error and a total number of transport blocks received over a multicast channel within the time interval.

12. The user equipment of claim 11, wherein the transmitter is to provide a value of the BLER in response to the ratio being greater than a second ratio that indicates that the probability of the application layer decoding error exceeds the first threshold.

13. The user equipment of claim 9, wherein the measurement circuitry is to measure a signal-to-interference ratio (SIR) for the multicast signal or the broadcast signal over a time interval.

14. The user equipment of claim 13, wherein the measurement circuitry is to determine a ratio of a signal power received on a physical multicast channel and an estimate of interference on the physical multicast channel over the time interval.

15. The user equipment of claim 14, wherein the measurement circuitry is to determine the signal power received on the physical multicast channel using a linear average of measured powers in resource elements that carry reference signals for the multicast signal or the broadcast signal.

16. The user equipment of claim 14, wherein the transmitter is to provide a value of the SIR in response to the ratio being less than a third ratio that indicates that the probability of the application layer decoding error exceeds the first threshold.

17. A non-transitory computer readable medium embodying a set of executable instructions, the set of executable instructions to manipulate at least one processor to:
   measure a characteristic of a multicast signal or a broadcast signal at a physical layer of user equipment; and
   provide a value of the measured characteristic from the user equipment in response to the value indicating that a probability of an application layer decoding error exceeds a first threshold for a multicast broadcast single frequency network (MBSFN) area associated with the user equipment.

18. The non-transitory computer readable medium of claim 17, wherein the set of executable instructions is to manipulate the at least one processor to measure a block error rate (BLER) for the multicast signal or the broadcast signal over a time interval provide a value of the BLER in response to the BLER indicating that a probability of an application layer decoding error is larger than a threshold.

19. The non-transitory computer readable medium of claim 17, wherein the set of executable instructions is to manipulate the at least one processor to measure a signal-to-interference ratio (SIR) for the multicast signal or the broadcast signal over a time interval provide a value of the SIR in response to the SIR indicating that a probability of an application layer decoding error is larger than a threshold.

* * * * *